United States Patent [19]

Oberg

[11] Patent Number: 5,794,657
[45] Date of Patent: Aug. 18, 1998

[54] SAFETY CHECK VALVE FOR FUEL DELIVERY SYSTEM

[76] Inventor: Gordon D. Oberg, 1717 S. Lake Stickney Dr., Lynnwood, Wash. 98037

[21] Appl. No.: 796,268

[22] Filed: Feb. 7, 1997

[51] Int. Cl.$^6$ ................................ F16K 15/00
[52] U.S. Cl. ................ 137/543.19; 137/543.21; 137/538
[58] Field of Search .......... 137/543.19, 543.21, 137/538, 590, 565; 280/834; 123/516, 509, 510

[56] References Cited

U.S. PATENT DOCUMENTS

| | | | |
|---|---|---|---|
| 2,934,085 | 4/1960 | Mylander | 137/543.19 |
| 3,457,949 | 7/1969 | Coulter | 137/543.19 |
| 3,463,185 | 8/1969 | Oliver et al. | 137/543.21 |
| 4,194,589 | 3/1980 | Parr | 137/543.21 |
| 4,214,721 | 7/1980 | Burhans, Jr. et al. | 244/135 |
| 4,265,271 | 5/1981 | Rosaen et al. | 137/543.19 |
| 5,092,361 | 3/1992 | Masuyama et al. | 137/543.21 |
| 5,590,675 | 1/1997 | Babb | 137/565 |

*Primary Examiner*—Denise L. Ferensic
*Assistant Examiner*—Joanne Y. Kim
*Attorney, Agent, or Firm*—Graybeal Jackson Haley LLP

[57] ABSTRACT

The invention concerns a fuel check valve to prevent unintentional siphoning of fuel from a cell should a fuel delivery line by severed. The check valve includes a valve housing having a fluid conduit coupling a first and second orifice. An internal seat is formed in the fluid conduit to receive a needle body having a seat mating portion that is complementary to the internal seat, thereby creating a fluid barrier when brought into compressive contact therewith. Compressive contact is created by a compression spring located intermediate between the valve housing and the needle body. When the check valve is included in a fuel delivery system, a partial vacuum created by a fuel pump downstream from the valve overcomes the spring bias to cause the needle body to unseat, thereby permitting fuel flow.

10 Claims, 2 Drawing Sheets

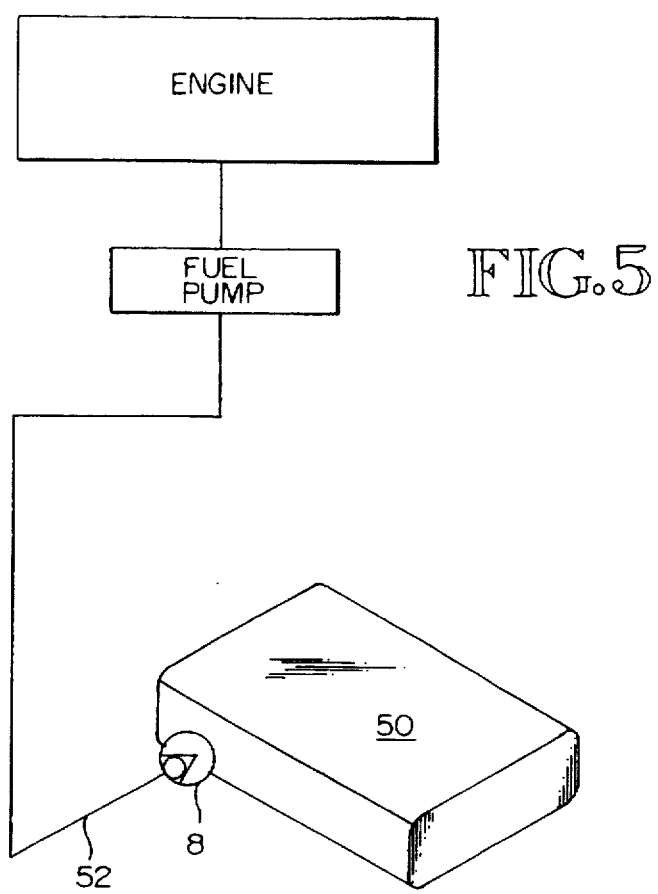

SAFETY CHECK VALVE FOR FUEL DELIVERY SYSTEM

FIELD OF THE INVENTION

The present invention relates generally to check valves, and more specifically to liquid fluid check valves for use in automotive fuel delivery systems.

BACKGROUND

In the field of motor vehicle safety, there are two principal concerns relating to impact worthiness: occupant safety from physical harm directly resulting from the impact, and from physical harm indirectly resulting from the impact. With reference to the later concern, fire hazard is the predominant form of occupant danger.

In many instances, a fuel tank, cell, or line is breached during a physical impact, causing the undesirable release of flammable fluid from the tank, cell, or line. Once released, fuel ignition potential is significantly increased since not only is the fuel subject to ignition by electrically or mechanically created sparks, but also by engine components. Moreover, highly volatile fuel vapors are certainly present, thus enhancing the probability of vapor ignition which certainly results in violent explosive consequences.

In the field of automotive racing (strip, track, or course racing), an ongoing goal is to reduce or eliminate fuel related injuries to both the occupant of the impacted vehicle and the surrounding environment which may include other vehicle drivers or spectators. Racing rules and guidelines such as those established by the NERA, IROC, NASCAR and other organizations and sponsors require the presence of certain mitigating devices. These devices range from requiring vehicle occupants to wear fire proof or fire retardant protective clothing to specialized fuel storage and delivery devices.

Recent advances in fuel storage devices for racing applications (hereinafter referred to as fuel cells) have lead to resilient, collapsible fuel cells. These fuel cells are designed to deform upon impact with the intention of permitting deformation of the cell without breach, thus holding the fuel captive therein. This advance in fuel cell technology, while eliminating some of the problems associated with rigid cells, creates new risk when the collapsed cell forces fuel to squirt out from a broken fuel line, under high pressure, like a squished balloon full of water. Should the resulting stream of volatile fuel ignite, it becomes a violent flame thrower.

Also, collapsible cells do not lessen the danger of fuel cell siphoning when the fuel line breaks between the cell and the vehicle engine.

Fluid siphoning occurs when a conduit is filled with fluid and one end is elevated above the other. Gravity causes movement of the fluid from the elevated end to the lower end. If the elevated end resides in a reservoir of fluid, fluid flow therefrom will continue until depleted or until an air lock in the line occurs. A similar problem exists with respect to fuel cells. If a fuel line between the cell and engine is severed, and the sever point is below the level of fuel, then siphoning will occur. The result is an unintended and dangerous delivery of volatile fuel to the environment. In the event that the sever was caused by an accident, conditions may be present to cause the siphoned fuel to ignite.

It is therefore desirable to create a system wherein the fuel remains in the cell subsequent to impact, especially when the fuel delivery and/or return lines are severed. The present invention is intended to meet this need by proposing an accessory in the form of a check valve.

SUMMARY OF THE INVENTION

The invention is directed towards a check valve for use in combination with a fuel storage device. When located adjacent to or integrated with the fuel storage device, any breach of any fuel line terminating at or originating from the fuel storage device will not result in expulsion of fuel from the breached line in the absence of a pressure differential that creates a sufficient partial vacuum external of the fuel storage device.

The check valve referred to above comprises a valve housing defining a first orifice and a second orifice wherein the first orifice is in fluid communication with the second orifice by way of a fluid conduit, and wherein the fluid conduit has an internal seat formed intermediate the first orifice and the second orifice; a valve body formed to closely fit into the second orifice, having a valve closing portion that complements the valve body seat shaped and sized to create a fluid barrier when held in contact therewith, and a bias member for urging the valve body against the valve seat under ambient pressure conditions.

In the preferred embodiment, the valve body has a conical or needle end, the bias member is a helical compression spring, and the valve seat is formed in a cylindrical housing that retains and guides the valve body and spring. In this preferred embodiment, the compressive force exerted by the spring on the valve body is generally equivalent to about one (1) pound per square inch. When the preferred embodiment of the invention is mounted at the outlet of the fuel cell, the partial vacuum created by the vehicle's fuel delivery pump in the fuel line is sufficient to overcome the spring bias. However, fuel pressure in a collapsed cell is not sufficient to force the valve open enough to discharge fuel out of a severed fuel line, and in a siphon situation the pressure differential is not sufficient given the maximum relative elevational differences between the fuel cell and the fuel line locations relative thereto to permit fuel to escape by siphoning.

BRIEF DESCRIPTION OF THE DRAWINGS

FIG. 5 is a schematic representation of a fuel delivery system using the invention.

DETAILED DESCRIPTION OF THE INVENTION

Figures 1, 2, 3, 4:
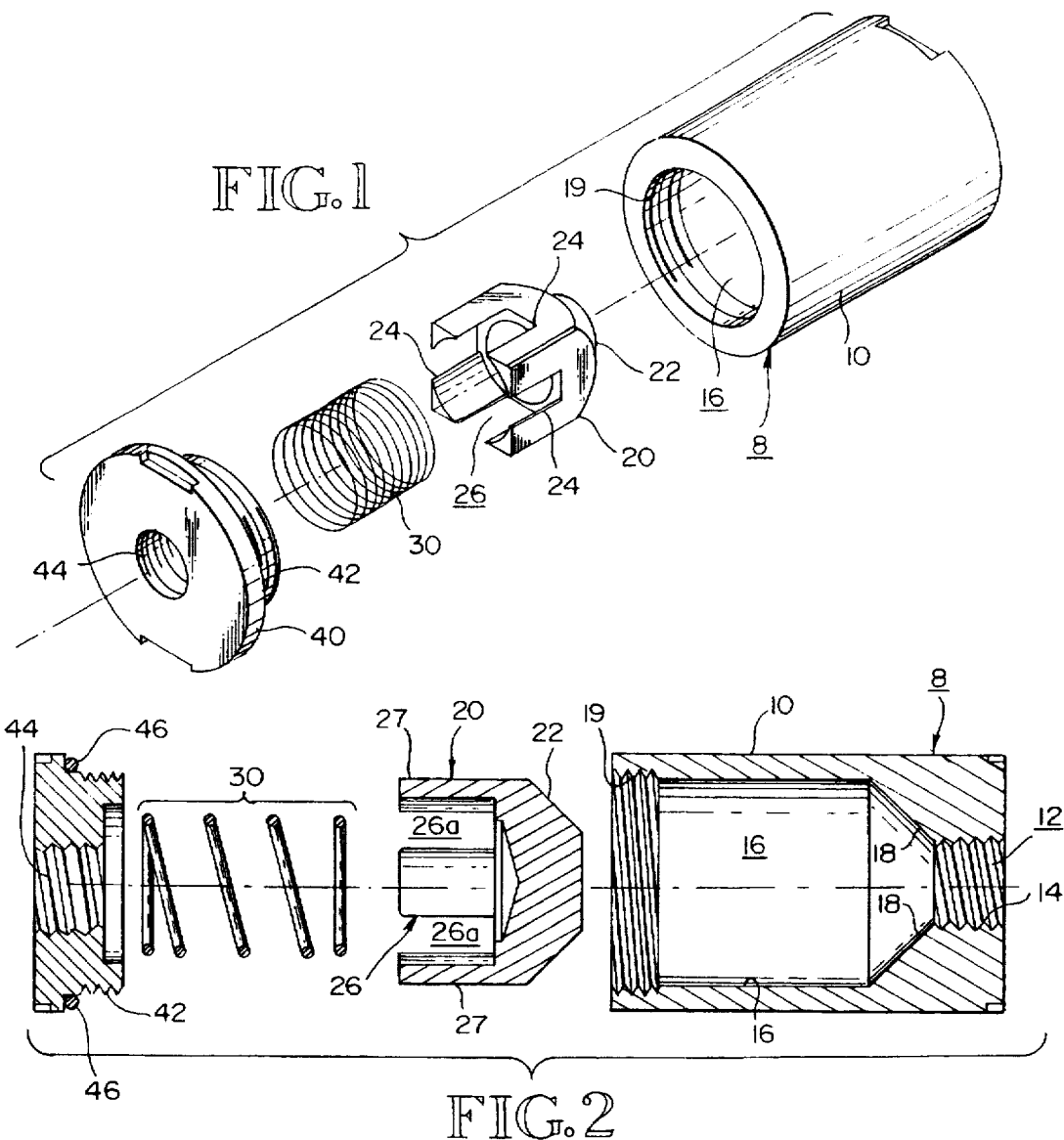
FIG. 1 is an exploded perspective view of the invention showing the major components thereof including a valve housing, a moveable valve body, a spring, and a retaining end bushing.
FIG. 2 is an exploded cross section elevation of the components shown in FIG. 1.
FIG. 3 is a front elevation view of the valve body shown in FIG. 2.
FIG. 4 is a perspective view of the invention shown mounted on a collapsible fuel cell.

Turning then to the several figures wherein like numerals indicate like parts, and more particularly to FIG. 1, an exploded perspective view of the invention is shown. The safety valve device 8 has three main components, four being shown: a cylindrical valve housing 10, needle or cone shaped valve body 20, spring 30, and retaining end bushing 40. While the components can be constructed from a range of materials, best results have been had when using brass or an aluminum alloy for valve housing 10, needle valve body 20, and retaining bushing 40. A corrosion resistant spring steel is used for spring 30.

As shown best in FIG. 2, valve housing 10 defines first orifice 12 having internal threads 14, and second orifice 16 forming a cylindrical cavity and having an axially tapered seat portion 18 near orifice 12. As is well known in the art, a tapered seat provides greater surface area to act as a barrier to liquid passage, and acts as an alignment aid when needle valve body 20 reciprocates within orifice cylinder 16.

Needle valve body 20 is machined to wholly fit within orifice cylinder 16, and has a maximum external diameter marginally less than the internal cylinder wall diameter of orifice 16 of valve body housing 10.

Needle valve body 20 is preferably formed from an elongated square section stock machined at one end with a truncated conical nose portion 22 that mates to axially tapered seat portion 18 to form the fluid barrier closing the valve. The rearward main portion of valve body 20 has a cavity 26 surrounded by a four-leg structure resulting from a round bore on axis with the nose 22, open to the rear and serving as a retainer and guide for spring 30. The square walls of the original stock are formed with axial slots 26a that open to the rear with the center bore and terminate before nose portion 22. The original corners of the stock are rounded as shown in FIG. 3 so as to form surface portions 27 that are fragments of an exterior cylinder and these portions 27 are in sliding guide contact with the interior cylinder of orifice 16.

Cavity 26 receives spring 30 when the components are assembled. The semicircular voids 28 between the slotted flats of body 20 and the slots 26a themselves ease the fluid flow around from the exterior of the needle valve body 20 to cavity 26, thereby equalizing fluid dynamics with respect to needle body 20 during operation of the valve. Fuel flow slots 26a permit fuel to migrate from orifice 12 towards bushing 40 when a sufficient decrease in fuel pressure at outlet 16 occurs so as to overcome the compression bias exerted by spring 30 on needle valve body 20.

In the preferred embodiment, a drop in line pressure of more than one (1) psi will overcome the spring bias. It is to be understood that any fluid conduit part of needle valve body 20 that permits passage of fuel from inlet orifice 12 to outlet orifice 16 and bushing 40 is contemplated.

As referenced above, spring 30 compressively resides in cavity 26 of needle valve body 20 when the invention is fully assembled. Bushing 40 functions as a spring retainer, and may be bonded, welded or threadably (as here) attached to valve housing 10. Internal threads 44 are adapted to receive a threaded fuel line 52 (see FIG. 4) through which fuel may be delivered to the vehicle's fuel pump and engine.

As shown in the several figures, bushing 40 has external threads 42 which are formed to threadably engage internal threads 19 of valve housing 10. Internal threads 44 are adapted to receive a threaded fuel line 52 (see FIG. 4) through which fuel may be delivered to the vehicle's fuel pump and engine.

The invention is preferably located adjacent to the fuel cell as is shown in FIG. 4 and schematically in FIG. 5. Here, cell 50 has an external nipple (not shown) to which is attached valve device 8. Fuel is permitted to flow therefrom when a partial vacuum of about one (1) psig exists in line 52. By locating the invention adjacent to cell 50, the siphoning effect from any line breach occurring thereafter will be virtually eliminated.

While only particular embodiments have been disclosed herein, it will be readily apparent to persons skilled in the art that numerous changes and modifications can be made thereto, including the use of equivalent means, devices, and method steps without departing from the spirit of the invention.

What is claimed is:

1. A fuel delivery system for an internal combustion engine, comprising:

a fuel tank having a fuel output port on said tank;

a fuel pump for developing a vacuum suction to pull fuel from said fuel tank output port for delivery to an internal combustion engine;

a safety check valve having a housing defining a central bore formed with an inlet and an outlet, said housing inlet fastened by threaded connection directly to said fuel output port of said fuel tank;

a fuel line connected from said outlet of said safety check valve housing to said fuel pump;

said safety check valve further having a conical valve seat in said bore of said housing and a needle valve body formed at a first end with a conical nose fitted to said conical seat and being movable axially in said bore to close and open fuel flow with respect to said valve seat, and formed at a second end with a square section guide portion having a hollowed out cavity that opens to the rear axially opposite said nose and rounded at the exterior corners to conform to said bore for guiding said needle valve body for axial movement therein, said square section guide portion defining flat sides that intercept the rearward extent of said conical nose and form low resistance fuel passages with respect to said bore, and a compression spring mounted in said bore and retained in said cavity of said square section guide portion for urging the needle valve body to its seated position, said compression spring having a force selected to normally hold the needle valve body in its seated position closing fuel flow and yielding to allow said needle valve body to unseat and open fuel flow when said fuel pump operates to cause a vacuum suction.

2. The fuel delivery system of claim 1, wherein said flat sides of said square section guide portion intersects with said hollowed out cavity to form additional lower resistance flow passages for fuel when said conical nose becomes unseated.

3. The fuel delivery system of claim 1, wherein said flat sides of said square section guide portion intersect with said hollowed out cavity to form legs parallel to the bore axis and projecting away from said conical nose to further reduce resistance to fuel flow after passing around said conical nose when unseated.

4. The fuel delivery system of claim 1, wherein said housing has first and second parts formed with complementary threaded portions that screw together to complete the housing and are separable by unthreading to open the housing for removal and cleaning of said needle valve body and compression spring.

5. The fuel delivery system of claim 1, wherein said housing inlet and outlet have threaded portions, said inlet threaded portion being directly connected to said output port of said fuel tank and said outlet being connected to said fuel line extending to said fuel pump.

6. The fuel delivery system of claim 1, wherein said compression spring has a force selected to yield when said fuel pump causes a vacuum suction of 1 psi or greater in said fuel line.

7. A safety fuel check valve for a fuel delivery system between a fuel tank and an engine fuel pump, comprising:

a check valve housing defining a cylindrical bore formed with axially aligned inlet and outlet, said inlet having threads for direct connection to an output port of said fuel tank, said safety check valve further having a conical valve seat in said bore of said housing and a needle valve body formed at a first end of said body with a conical nose fitted to said conical seat and being movable axially in said bore to close and open fuel flow with respect to said valve seat, and said valve body having a guide portion formed at a second end axially opposed to said conical nose, said guide portion having a generally square section structure that is hollowed out at the end opposite said conical nose to define a cavity and on which structure the exterior corners are rounded to conform to said bore for being guided thereby, said square section structure defining flat sides that are spaced inwardly from said housing bore to form reduced resistance passages for fuel, and a compression spring mounted in said bore and retained in said cavity for urging the needle valve body to its seated position, said compression spring having a force selected to normally hold the needle valve body in its seated position closing fuel flow and yielding to allow said needle valve body to unseat and open fuel flow when a fuel pump operates to cause a vacuum suction in the fuel line.

8. The fuel delivery system of claim 7, wherein said flat sides of said square section guide structure intersect said hollowed out cavity to form additional free flow passages for fuel when said conical nose becomes unseated.

9. The fuel delivery system of claim 8, wherein said flat sides of said square section structure intersect with said hollowed out cavity to form legs that project axially away from said conical nose for guiding said conical nose and to form slotted openings in said flat sides communicating with said cavity to form additional free flow passages for fuel passing around said conical nose when unseated.

10. The fuel delivery system of claim 7, wherein said housing has first and second parts formed with complementary threaded portions that screw together to complete the housing and are separable by unthreading to open the housing for removal and cleaning of said needle valve body and compression spring.

* * * * *